United States Patent [19]

Ainscow et al.

[11] Patent Number: 4,720,375
[45] Date of Patent: Jan. 19, 1988

[54] PROCESS FOR PRODUCING MAGNESIUM OXIDE

[75] Inventors: William S. Ainscow, Winterthur; Balkrishna B. Gadgil, Raterschen, both of Switzerland

[73] Assignee: Sulzer Brothers Limited, Winterthur, Switzerland

[21] Appl. No.: 801,741

[22] Filed: Nov. 26, 1985

[30] Foreign Application Priority Data

Nov. 27, 1984 [EP] European Pat. Off. ........ 84114353.0

[51] Int. Cl.$^4$ .............................................. C01F 11/04
[52] U.S. Cl. .................... 423/175; 423/165; 423/356; 423/431; 423/470; 423/497; 423/637
[58] Field of Search ............... 423/165, 175, 173, 356, 423/431, 470, 497, 637

[56] References Cited

U.S. PATENT DOCUMENTS

| | | | |
|---|---|---|---|
| 1,816,996 | 8/1931 | Barrett | 423/165 |
| 1,893,047 | 1/1933 | Barrett | 423/165 |
| 1,969,769 | 8/1934 | Sweet et al. | 423/165 |
| 2,137,675 | 11/1938 | MacIntire | 423/165 |
| 4,335,083 | 6/1982 | Benson | 423/155 |
| 4,508,690 | 4/1985 | Obrist et al. | 423/173 |

*Primary Examiner*—John Doll
*Assistant Examiner*—Wayne A. Langel
*Attorney, Agent, or Firm*—Kenyon & Kenyon

[57] ABSTRACT

High purity magnesium oxide is obtained from a magnesite-containing ore, the impurities of which include calcium compounds. The ore is first calcined and the resulting magnesium oxide is converted to magnesium chloride by leaching with an ammonium chloride solution. Calcium chloride is also produced at the same time. The resulting magnesium chloride and calcium chloride are treated with carbon dioxide to form calcium carbonate and magnesium carbonate which can be precipitated and filtered out of the resulting magnesium chloride solution. The magnesium chloride solution is then reacted with ammonium carbonate to produce a magnesium carbonate trihydrate crystal slurry containing ammonium chloride. The ammonium chloride is subsequently removed and returned to the ammonia recovery stage for leaching of the calcined magnesium oxide while the crystals are dried and decomposed into carbon dioxide and magnesium oxide.

5 Claims, 1 Drawing Figure

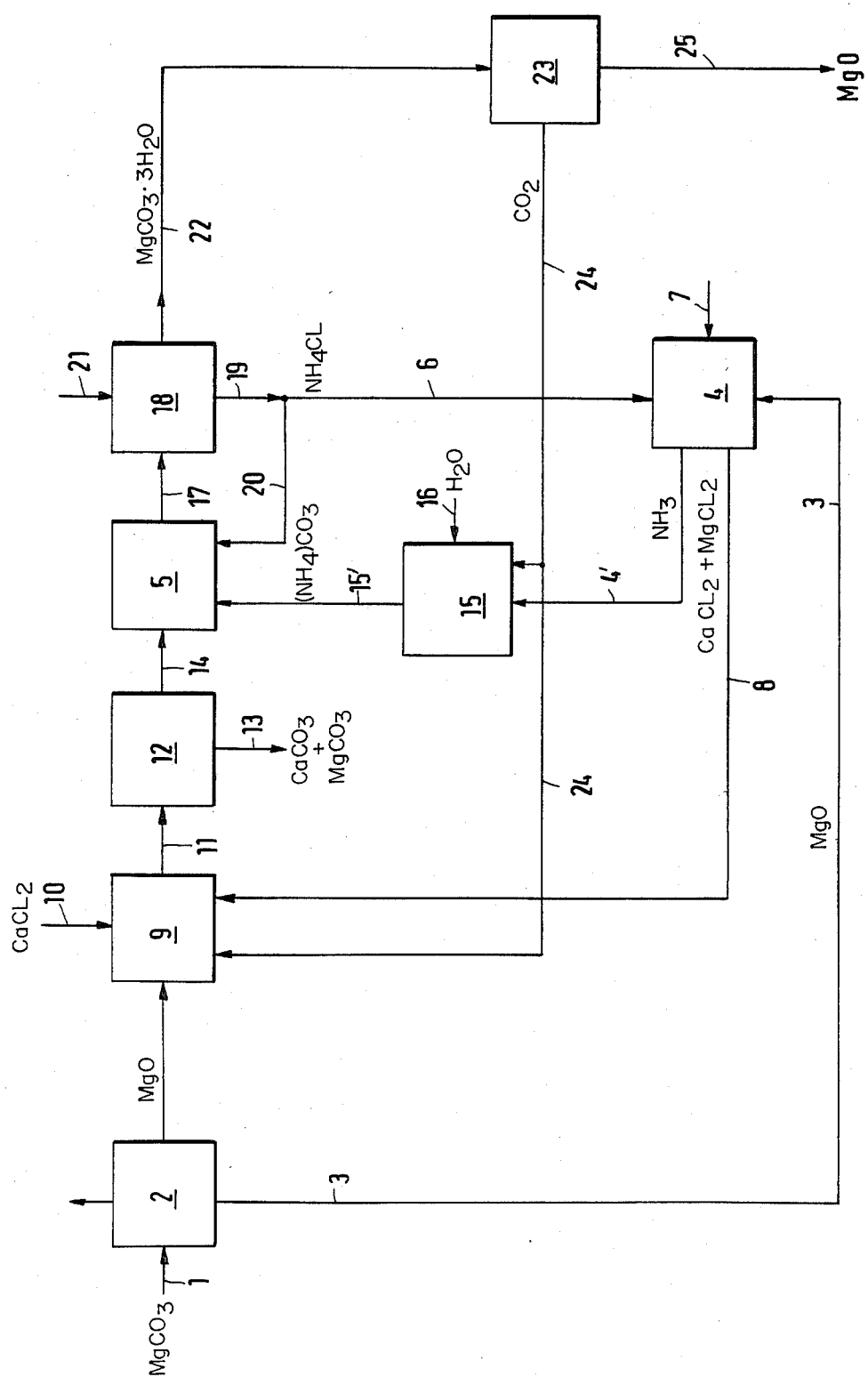

PROCESS FOR PRODUCING MAGNESIUM OXIDE

This invention relates to a process and apparatus for producing magnesium oxide. More particularly, this invention relates to a process and apparatus of producing high purity magnesium oxide. More particularly, this invention relates to a process and apparatus for producing very pure magnesium oxide from an ore containing magnesium.

Heretofore, various types of techniques have been known to produce magnesium oxide from magnesium-containing ores. In some cases, the known techniques have employed hydrochloric acid in order to leach magnesium from the ore with subsequent purifying and heating steps in order to obtain magnesium oxide. However, one disadvantage of this method is that a large amount of energy is required for thermal decomposition.

It has also been known, for example, from U.S. Pat. No. 4,508,690 to calcine an ore in order to obtain magnesium oxide which is thereafter treated with calcium chloride and carbon dioxide to obtain a magnesium chloride solution which is thereafter treated to obtain magnesium oxide. However, such a process generally requires a large number of process stages so that the plant for performing the process becomes expensive.

Accordingly, it is an object of the invention to reduce the costs involved in obtaining a high purity magnesium oxide from a magnesite-containing ore.

It is another object of the invention to reduce the number of process stages required for the processing of a magnesium containing ore to obtain high purity magnesium oxide.

It is another object of the invention to provide a cost effective process and apparatus for the production of magnesium oxide from a magnesium containing ore.

Briefly, the invention provides a process and apparatus for producing magnesium oxide from a magnesium containing ore which is capable of producing magnesium oxide upon calcination.

The process includes the steps of calcining the ore to obtain magnesium oxide and thereafter leaching at least some of the magnesium oxide with ammonium chloride solution in a recovery stage in order to obtain ammonia and magnesium chloride, for example in solution. Thereafter, the magnesium chloride solution is treated in a precipitation stage in order to precipitate magnesium carbonate trihydrate from the solution while forming ammonium chloride for delivery to the recovery stage. Next, the obtained magnesium carbonate trihydrate is filtered, washed, dried and calcined in order to obtain magnesium oxide of high purity.

Where the ore contains impurities, such as calcium compounds, the leaching step also produces calcium chloride in the ammonia recovery stage. In this case, the calcium chloride and magnesium chloride from the recovery stage are combined in a second precipitation stage with carbon dioxide, added magnesium oxide and added calcium chloride in order to precipitate calcium carbonate while forming a magnesium chloride solution for delivery to the first precipitation stage. Thereafter, the calcium carbonate and any other carbonates may be separated from the solution so that a relatively pure magnesium chloride solution is delivered to the first precipitation stage.

In accordance with the process, the ammonia from the ammonia recovery stage is combined with carbon dioxide to form ammonium carbonate which is then delivered to the first precipitation stage to be mixed with the magnesium chloride solution therein in order to produce the magnesium carbonate trihydrate as well as forming ammonium chloride which can then be delivered to the ammonia recovery stage.

The apparatus for producing magnesium oxide includes a furnace, an ammonia recovery stage, a precipitation stage, a separating and washing means and a drying and decomposition means.

The furnace is used to calcine the magnesium containing ore in order to obtain magnesium oxide.

The ammonia recovery stage is constructed to receive the magnesium oxide from the furnace as well as a flow of ammonium chloride solution from the separating and washing means in order to form ammonia and magnesium chloride.

The precipitation stage is constructed to receive magnesium chloride from the ammonia recovery stage and ammonium carbonate in order to obtain a slurry of magnesium carbonate trihydrate crystals and ammonium chloride.

The separating and washing means receives the slurry from the precipitation stage and serves to separate the slurry into ammonium chloride solution for delivery to the ammonia recovery stage and magnesium carbonate trihydrate.

The drying and decomposition means serves to decompose the magnesium carbonate trihydrate crystals into magnesium oxide and carbon dioxide.

Where the ore contains calcium impurities, the apparatus also includes a second precipitation stage while the ammonia recovery stage also serves to produce calcium chloride from the calcium impurities. The second precipitation stage is constructed to receive the magnesium chloride and calcium chloride directly from the ammonia recovery stage as well as carbon dioxide, which may be produced in the drying and decomposition means, as well as additional magnesium oxide from the furnace and additional calcium chloride from an extraneous source. The precipitation stage serves to convert the calcium chloride into calcium carbonate while forming a suspension of magnesium chloride solution and calcium carbonate. In addition, a filter is associated with the second precipitation stage in order to remove the calcium carbonate from the magnesium chloride suspension so that the suspension can be delivered to the first precipitation stage for reaction with the ammonium carbonate received therein.

The apparatus may also include an absorption device which is connected to the decomposition means in order to receive carbon dioxide therefrom as well as to the ammonia recovery stage to receive ammonia therefrom. The absorption device is thus able to form ammonium carbonate which is then delivered to the precipitation stage in which the magnesium chloride solution is treated to form the magnesium carbonate trihydrate crystal slurry.

These and other objects and advantages of the invention will become more apparent from the following detailed description taken in conjunction with the accompanying drawing.

The drawing illustrates a flow diagram of an apparatus for performing a process in accordance with the invention.

Referring to the drawing, the apparatus includes a furnace 2 to which a raw material, such as a magnesite ore containing magnesium carbonate in pre-ground form, is delivered via a path 1. In practically every case, the ore contains considerable quantities of impurities, mainly SiO$_2$, Fe$_2$O$_3$, Al$_2$O$_3$, and also calcium compounds such as calcium carbonate (CaCO$_3$). The furnace 2 operates so as to calcine the ore in order to obtain magnesium oxide. Any suitable technique may be used to carry out the calcining step. However, the resulting magnesium oxide still contains the above-noted impurities.

The plant also includes an ammonia recovery stage 4 to which magnesium oxide is passed via a path 3 from the furnace 2. In addition, ammonium chloride solution (NH$_4$Cl) is also fed through a flow path 6 into the ammonia recovery stage 4. During operation of the recovery stage 4, the magnesium oxide is fed continuously to the ammonium chloride solution for leaching purposes, the magnesium oxide being slowing dissolved therein in accordance with the equation:

$$MgO + 2NH_4Cl \rightarrow 2NH_3 + MgCl_2 + H_2O$$

The ammonium chloride solution originates from a precipitation stage 5 for magnesium carbonate trihydrate, which will be discussed thereinafter.

The ammonia (NH$_3$) which is formed during the leaching operation is removed from the reaction mixture by the supply of steam, which passes into the recovery stage 4 via a line 7. As indicated, the ammonia is removed via a line 4'.

The calcium compounds which were present in the magnesite ore are simultaneously leached in the recovery stage 4 in order to form ammonia and calcium chloride in accordance with the equation:

$$2NH_4Cl + CaO \rightarrow 2HN_3 + CaCl_2 + H_2O$$

The resulting calcium chloride must then be removed, since otherwise, the calcium chloride would be contained in the desired end product, that is, the high-purity magnesium oxide. To this end, the calcium chloride together with the magnesium chloride is fed from the recovery stage 4 via a path 8 to a precipitation stage 9 and is combined with magnesium oxide from the furnace 2 and with carbon dioxide which is delivered via a line 24. As a result magnesium chloride (MgCl$_2$) is formed and calcium carbonate (CaCO$_3$) is precipitated in accordance with the equation:

$$MGO + CaCl_2 + CO_2 \rightarrow MgCl_2 + CaCO_3$$

Since the concentration of the calcium chloride entrained by the magnesium chloride is only very small, the reaction takes place only slowly and a long residence time would be necessary in the precipitation stage 9. However, the rate of the reaction can be greatly increased by the addition of further calcium chloride so that the residence time of the solution in the precipitation stage 9 is much shorter. The calcium chloride used originates from an extraneous source and is introduced in the precipitation stage 9 via a line or flow path 10.

During the reaction with the precipitation stage 9 the amount of carbon dioxide introduced may only be such as to prevent the pH from falling below 5.5, since otherwise the reaction stops irreversibly, even if an equal amount of magnesium oxide is undissolved. If necessary, raw magnesium oxide can be added afterwards.

The precipitated calcium carbonate and the impurities are suspended in the solution containing about 15% magnesium chloride.

The apparatus also includes a filter 12 which is disposed between the precipitation stages 9, 5. This filter 12 receives the suspension which is produced in the first precipitation stage 9 via a flow path 11. The filter 12 is constructed in a conventional manner in order to separate the solid matter of the suspension, the calcium carbonate mixed with impurities and some magnesium carbonate, for withdrawal through a flow path 13 while the remaining clear magnesium chloride solution flows via a flow path 14 to the precipitation stage 5.

The precipitation stage 5 also receives a flow of ammonium carbonate which is reacted with the magnesium chloride solution in order to produce magnesium carbonate trihydrate (MgCO$_3$.3H$_2$O) in accordance with the equation:

$$MgCl_2 + (NH_4)_2CO_3 + 3H_2O \rightarrow MgCO_3.3H_2O + 2NH_4Cl$$

Of note, the ammonium carbonate is prepared in an absorption device 15 in which the ammonia forming in the recovery stage 4 and delivered via the path 4' and carbon dioxide delivered from the flow path 24 are dissolved in water which is fed in via a flow path 16. The resulting ammonium carbonate is fed through the precipitation stage 5 via a flow path 15'.

During operation, the temperature of the precipitation stage 5 is maintained in a range of from 25° C. to 45° C. while the pressure is atmospheric and the pH is maintained between 7.5 and 8.5.

The plant also includes a separating and washing means 18 which is constructed to receive the crystal slurry from the precipitation stage 5 via a flow path 17 on a continuous basis. In addition, the separating and washing means 18 is constructed so that the slurry is separated from the entrained solution so that a clear solution consisting primarily of ammonium chloride may flow off via a flow path 19. As indicated, some of the ammonium chloride solution may be recycled to the precipitation stage 5 via a flow path 20 while the remainder of the solution flows via the flow path 6 to the recovery stage 4. The optimum solids concentration for the process can be set in the cycle by appropriate choice of the quantity of the two flows on the path 20.

The solids accumulating in the separating and washing means 18, which consist of magnesium carbonate trihydrate crystals and mother liquor, are washed with the minimum amount of water in counter-current relation in order to remove the mother liquor. To this end, water is fed into the washing and separating means 18 via a flow path 21 on a continuous basis. The washed solids, which now consist of pure magnesium carbonate trihydrate crystals and moisture flow via a flow path 22 to a drying and decomposition means 23 where the crystals are decomposed into magnesium oxide and carbon dioxide. The liberated carbon dioxide then flows into the flow path 24 for delivery partly to the absorption device 15 and partly to the calcium carbonate precipitation stage 9. The remaining magnesium oxide flows off via a flow path 25. In this regard, the magnesium oxide is of high purity.

The invention thus provides a process and apparatus for producing high purity magnesium oxide in a cost efficient manner by reducing the number of stages required to produce the magnesium oxide.

Further, the invention provides a relatively simple process for removing calcium impurities which may be contained in the magnesium containing ore which is processed into magnesium oxide.

What is claimed is:

1. A process of producing magnesium oxide comprising the steps of
    obtaining an ore containing magnesium and being capable of producing magnesium oxide upon calcination;
    calcining the ore to obtain magnesium oxide;
    leaching the magnesium oxide with ammonium chloride solution in a recovery stage to obtain ammonia, calcium chloride from calcium impurities in the calcined ore and a magnesium chloride solution;
    combining the calcium chloride and magnesium chloride solution from the recovery stage in a first precipitation stage with carbon dioxide, magnesium oxide and added calcium chloride to precipitate calcium carbonate while forming a magnesium chloride solution;
    precipitating magnesium carbonate trihydrate from the magnesium chloride solution in a second precipitation stage while forming ammonium chloride for delivery to the recovery stage; and
    filtering, washing, drying and calcining the magnesium carbonate trihydrate to magnesium oxide.

2. A process as set forth in claim 1 which further comprises the steps of combining the ammonia from the recovery stage with carbon dioxide to form ammonium carbonate for delivery to the first precipitation stage.

3. In a process of producing magnesium oxide, the steps of
    calcining an ore containing magnesium and calcium oxide impurities with ammonium chloride solution to obtain ammonia, calcium chloride and a magnesium chloride solution;
    combining the magnesium chloride solution and calcium chloride with carbon dioxide, magnesium oxide and added calcium chloride to obtain a suspension of calcium carbonate in a second magnesium chloride solution;
    separating the calcium carbonate from the second magnesium chloride solution;
    combining ammonium carbonate with the second magnesium chloride solution to obtain magnesium carbonate trihydrate and an ammonium chloride solution; and
    separating the magnesium carbonate trihydrate from the ammonium chloride solution for subsequent drying to magnesium oxide.

4. In a process as set forth in claim 3 wherein the second magnesium chloride solution contains about 15% magnesium chloride.

5. In a process as set forth in claim 3 wherein the carbon dioxide is added to prevent the pH of the suspension from falling below 5.5.

* * * * *